US007009529B2

(12) United States Patent
Hoermann

(10) Patent No.: US 7,009,529 B2
(45) Date of Patent: *Mar. 7, 2006

(54) MULTIFREQUENCY GARAGE DOOR OPENER

(75) Inventor: Michael Hoermann, Oerlinghausen (DE)

(73) Assignee: Marantec America Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/993,898

(22) Filed: Nov. 22, 2004

(65) Prior Publication Data

US 2005/0093716 A1 May 5, 2005

Related U.S. Application Data

(63) Continuation of application No. 10/125,016, filed on Apr. 18, 2002, now Pat. No. 6,847,303.

(60) Provisional application No. 60/289,193, filed on May 7, 2001.

(51) Int. Cl.
*G08C 19/00* (2006.01)
*H04Q 9/00* (2006.01)
*H02P 7/285* (2006.01)

(52) U.S. Cl. ............................... 340/825.73; 340/5.71; 160/188; 318/16; 388/835

(58) Field of Classification Search ........... 340/825.73, 340/825.72, 5.71; 160/188, 189; 49/372, 49/373, 463, 464; 318/16; 361/752; 388/835
See application file for complete search history.

(56) References Cited

U.S. PATENT DOCUMENTS

| | | | | |
|---|---|---|---|---|
| 4,045,715 A * | 8/1977 | Umpleby et al. | ............. | 318/16 |
| 4,241,870 A * | 12/1980 | Marcus | .................. | 340/825.72 |
| 5,680,134 A * | 10/1997 | Tsui | ...................... | 340/825.73 |
| 6,118,243 A * | 9/2000 | Reed et al. | ................. | 318/468 |
| 6,847,303 B1 * | 1/2005 | Hoermann | ............. | 340/825.73 |

* cited by examiner

*Primary Examiner*—Brian Zimmerman
*Assistant Examiner*—Clara Yang
(74) *Attorney, Agent, or Firm*—Michael B. McMurry

(57) ABSTRACT

A garage door power module is provided with the capability of operating over a number of different operating frequencies by configuring a power module chassis with a receptacle for receiving radio receivers where each of the receivers is adapted to receive one of radio signals. The receptacle located near one edge of the chassis and is configured with a planer surface and support members that permit the receivers to be slidably inserted and removed from the receptacle. In addition the radio receiver is equipped with a plug connector and the receptacle is equipped with a socket for receiving the plug connector in order to transmit radio control signals from the receiver to logic control circuits in the power module.

5 Claims, 3 Drawing Sheets

MULTIFREQUENCY GARAGE DOOR OPENER

This application is a continuation of application of Ser. No. 10/125,016, filed Apr. 18, 2002, now U.S. Pat. No. 6,847,303, which claims priority on provisional application Ser. No. 60/289,193, filed May 7, 2001.

FIELD OF THE INVENTION

This invention generally relates to garage door openers and in particular to garage door openers that utilize radio remote controls.

BACKGROUND OF THE INVENTION

Garage door opening systems that use radio remote controls have used a single operating frequency, usually 433 MHz. There are locations, however, where other sources of radio energy can generate electro-magnetic radiation that interferes with the operation of the remote control operating on that frequency.

SUMMARY OF THE INVENTION

It is therefore an object of the invention to provide a garage door opener capable of operating on more than one radio frequency.

It is also an object of the invention to provide a garage door power module with a receptacle for receiving plug-in receiver modules having different remote control radio frequencies.

DETAILED DESCRIPTION OF THE INVENTION

Figure 1:
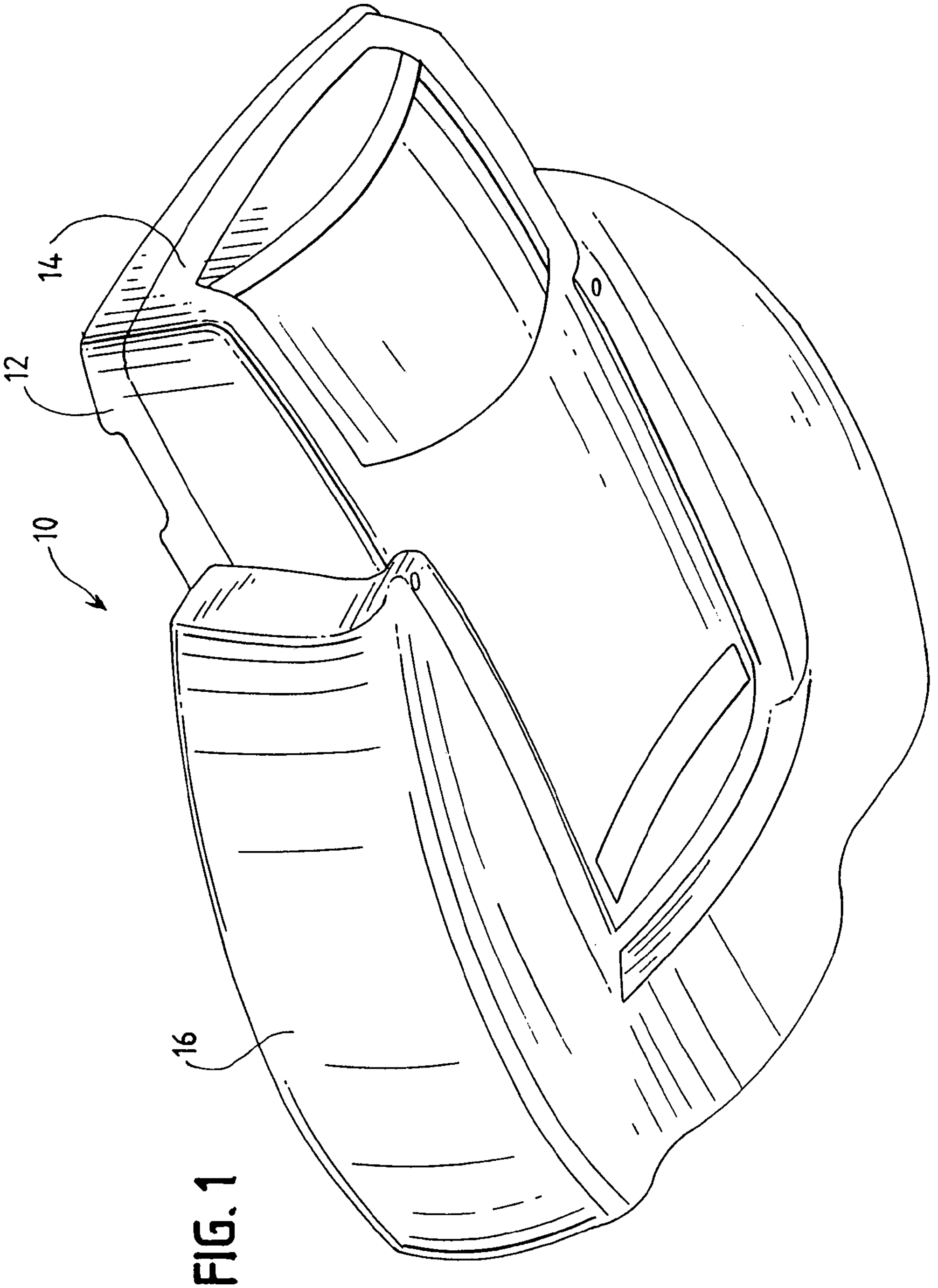
FIG. 1 is a perspective bottom view of an assembled garage door power module.

As an environment for the invention, FIG. 1 provides a perspective view of a representive a garage door power module or power head 10 as viewed from below when the power module 10 is attached to a rail and garage ceiling supports (not shown). Included in the power module 10 is a chassis 12 and a housing 14 that is secured to the chassis 12. In addition, a lamp lense 16 that covers one or more light bulbs (not shown) is secured to the housing 14. Preferably, the lamp lense 16 is a one piece lense formed out of plastic and covers one light bulb in front of the housing 14 and light bulbs on each side of the housing 14. The light bulbs are placed in lamp socket holders (not shown) which in turn are secured to each side and the front of the housing 14. The lamp lense 16 is secured to the housing 14 by a snap-in arrangement.

Figure 2:
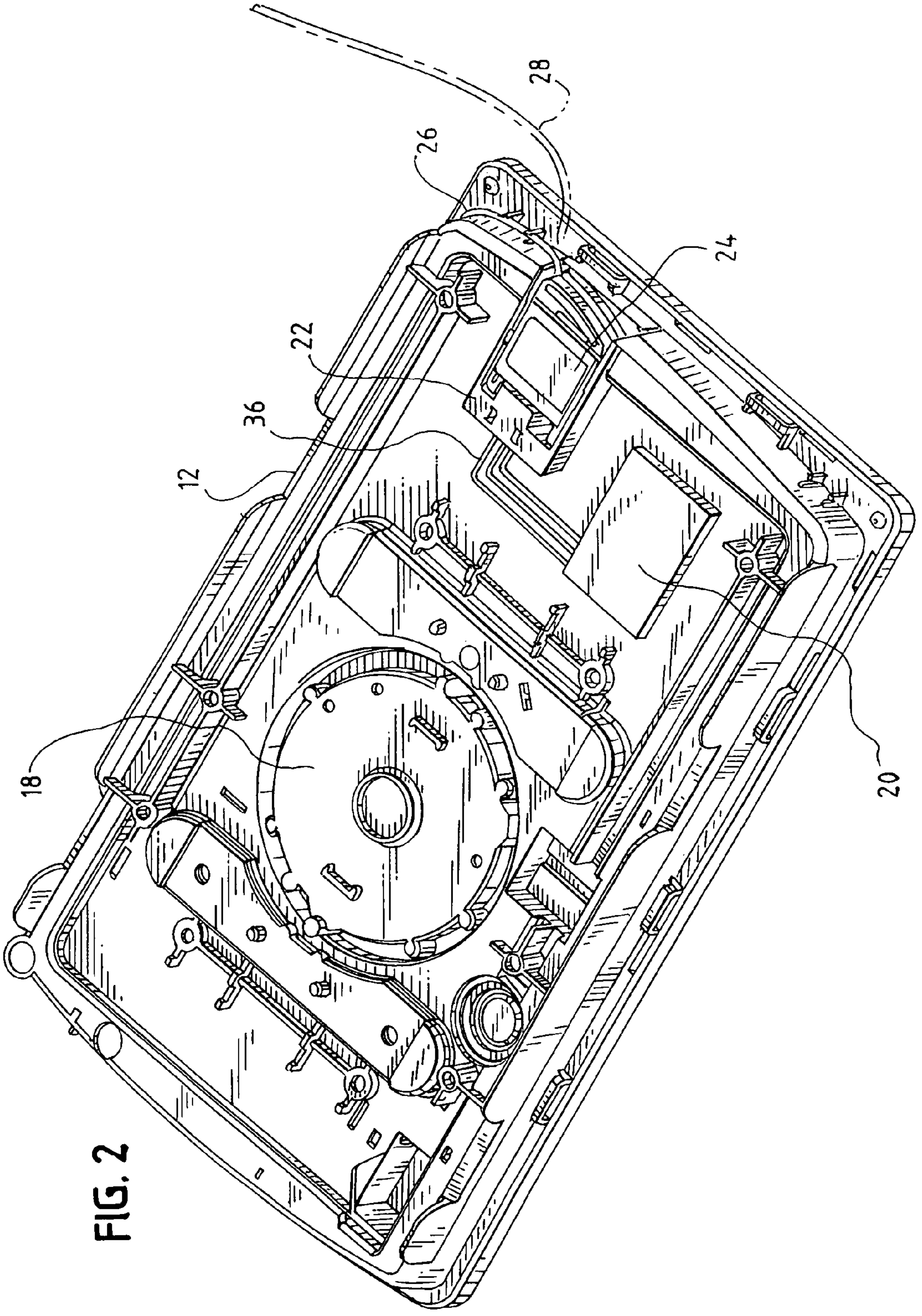
FIG. 2 is a perspective view of a garage door power module chassis for use with the power module of FIG. 1 including a plug-in radio receiver module according to the invention.

FIG. 2 provides an illustration of the preferred embodiment of the chassis 12 which includes a support portion 18 for receiving a garage door opener motor assembly (not shown) and a logic board 20 having circuitry for controlling the motor, lights and other elements of the power module 10. Most of the other components of the power module 10 have been removed from the chassis 14 in FIG. 2 for simplicity of illustration. In the preferred embodiment, the chassis is configured with a receptacle 22 for receiving a garage door remote control radio receiver 24. An antenna 26 is attached to the radio receiver 20 and is preferably encapsulated in the power module 10 when the housing 14 is attached to the chassis 12. In this embodiment, the antenna 26, represented by dashed lines 28 in FIG. 2 before the housing 14 is secured to the chassis 12, is placed between various inner and outer brackets and other components of the chassis 12 as shown in FIG. 2. In this manner the antenna 26 will be encapsulated in the power module 10 when the housing 14 is mounted on the chassis 12.

Figure 3:
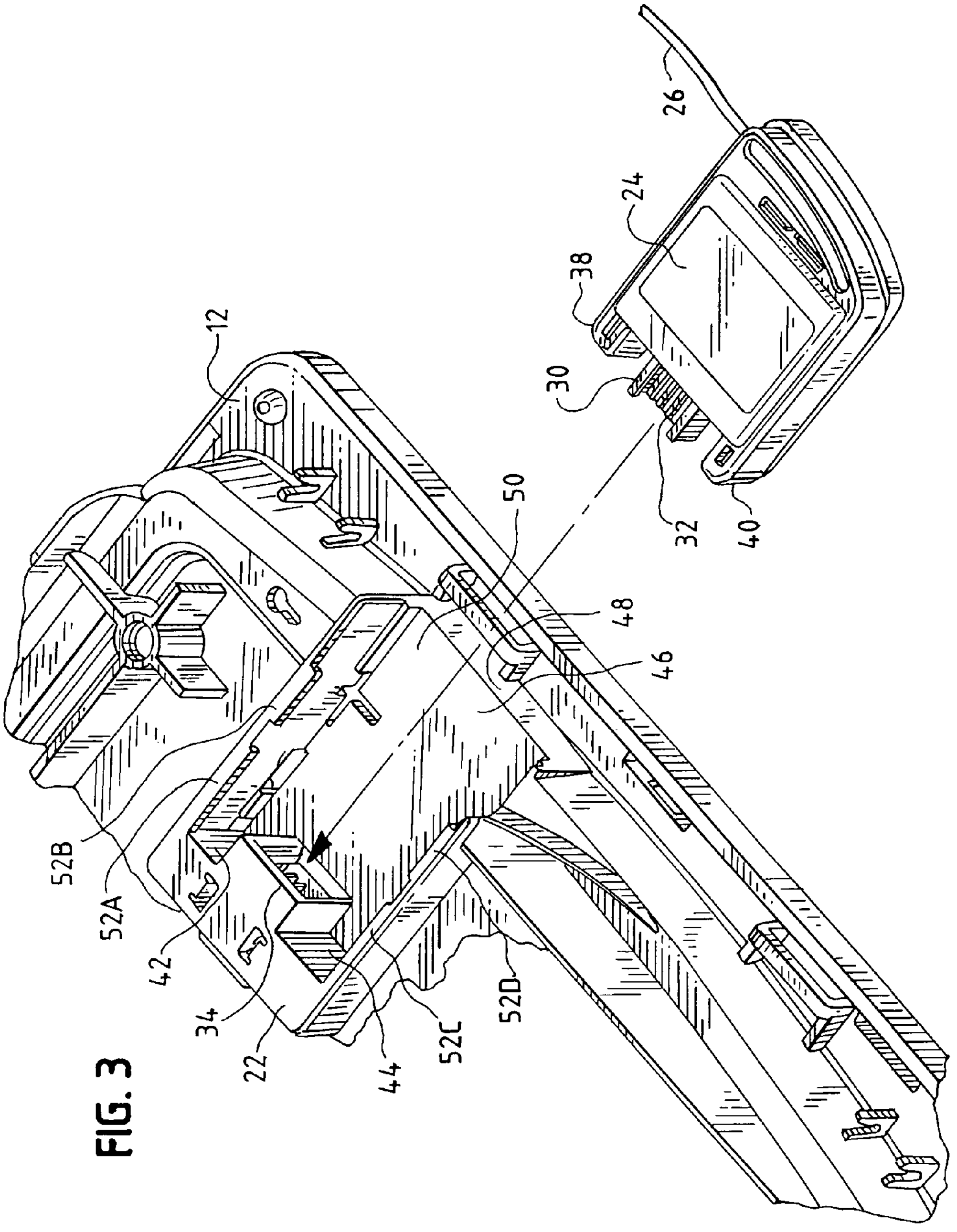
FIG. 3 is a partial perspective view of the chassis of FIG. 2 with the radio receiver module removed from a receptacle on the chassis of FIG. 2.

FIG. 3 depicts a detailed partial portion of the chassis 12 including the receptacle 22 and shows the radio receiver 24 removed from the receptacle 22. As shown in FIG. 3 the receiver 24 includes a plug connector 30 having a set of three pins 32. The plug connector 30 is configured to be received by a plug-in socket 34 in the receptacle 22. In this manner the radio receiver 24 can communicate with the logic board 20 on the chassis 14 over a set of lines 36 as illustrated in FIG. 2. To facilitate replacement, the receiver 24 includes a pair of projections 38 and 40 that serve to guide and secure the receiver 24 into the receptacle 22 by engaging with a pair of indentations 42 and 44 configured in the receptacle 22. In the preferred embodiment, the receptacle 22 is generally rectangular in shape as shown at 46 and is located near an edge 48 of the chassis 12. The receptacle 22 includes a generally planer surface 50 mounted on the chassis 12 with a number of retaining surfaces 52A–D or projections located opposite or above the planer surface 50. This arrangement provides for a particularly convenient method of replacement of the radio receiver 24 since all that is necessary to replace the receiver 24 is to remove the housing 14 from the chassis 12 and slide the receiver 24 from the receptacle 34.

One significant advantage of the invention is the ability to change operating radio frequencies of the power module 10 without disassembling the chassis 12 or having to enter the systems main circuitry on the logic board 20 by simply plugging in a new radio receiver in the receptacle 22. Due to the arrangement shown in FIGS. 2 and 3, radio receivers having for example operating frequencies of 40 MHz, 433 MHz or 390 MHz can easily be substituted in the event that one frequency is subject to electromagnetic interference.

It should be understood that the invention has been described in terms of a particular or representive garage door power module 10 and modifications including the location and configuration of the receptacle 22, antenna 26 and the configuration of the radio receiver 24 can be made without departing from the concept of the invention. A variety of other methods for securing the receiver 24 in the receptacle 22 can be used such as flexible brackets or locking pins can be used along with other configurations of the receiver and receptacle.

I claim:

1. A garage door power module that includes a motor support and logic circuitry for controlling a motor comprising:

a chassis having a base member and including the motor support and the logic circuitry located on said base member;

a housing adapted to be secured to said chassis;

a plurality of radio receivers each including an external antenna and wherein each of said radio receivers has a different predetermined operating frequency; and a receptacle configured in said chassis to permit said receptacle to slidably receive and secure one of said radio receivers to said chassis and wherein said radio receiver secured in said chassis and its antenna are enclosed within said housing.

2. The module of claim 1 wherein said radio receivers include a connector and said receptacle is configured to receive said connector so as to electrically connect said radio receiver to the logic circuitry.

3. The module of claim 1 wherein said receivers are configured with at least one retaining member effective to retain said radio receivers within said receptacle.

4. The module of claim 3 wherein said receptacle is generally rectangular in shape and includes a planar surface located on said base member and said retaining member is located opposite said planner surface and adapted to retain said radio receivers on said chassis.

5. The module of claim 1 wherein said receptacle is located along one edge of said chassis.

* * * * *